(12) United States Patent
Phillips et al.

(10) Patent No.: US 8,366,581 B2
(45) Date of Patent: *Feb. 5, 2013

(54) MULTI-SPEED TRANSMISSION HAVING STACKED PLANETARY GEAR SETS

(75) Inventors: Andrew W. Phillips, Rochester, MI (US); Scott H. Wittkopp, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 183 days.

This patent is subject to a terminal disclaimer.

(21) Appl. No.: 12/797,294

(22) Filed: Jun. 9, 2010

(65) Prior Publication Data

US 2011/0306459 A1    Dec. 15, 2011

(51) Int. Cl.
*F16H 3/62* (2006.01)
*F16H 3/44* (2006.01)

(52) U.S. Cl. .......... 475/278; 475/285; 475/903

(58) Field of Classification Search .......... 475/269, 475/271, 275, 284, 296, 330
See application file for complete search history.

(56) References Cited

U.S. PATENT DOCUMENTS

| | | | |
|---|---|---|---|
| 4,224,838 A | 9/1980 | Roushdy et al. | |
| 4,229,996 A | 10/1980 | Hildebrand | |
| 5,285,111 A | 2/1994 | Sherman | |
| 5,429,557 A | 7/1995 | Beim | |
| 5,484,348 A * | 1/1996 | Brown et al. | 475/248 |
| 5,503,605 A | 4/1996 | Beim | |
| 5,558,173 A | 9/1996 | Sherman | |
| 5,919,111 A * | 7/1999 | Park | 475/269 |
| 5,993,347 A | 11/1999 | Park | |
| 6,860,831 B2 * | 3/2005 | Ziemer | 475/296 |
| 7,670,246 B2 * | 3/2010 | Kamm et al. | 475/275 |
| 7,699,736 B2 | 4/2010 | Diosi et al. | |
| 7,803,082 B2 | 9/2010 | Diosi et al. | |
| 7,824,302 B2 | 11/2010 | Diosi et al. | |
| 8,043,190 B2 * | 10/2011 | Phillips | 475/276 |
| 2006/0180366 A1 | 8/2006 | Brill et al. | |
| 2008/0153653 A1 | 6/2008 | Diosi et al. | |
| 2008/0269004 A1 | 10/2008 | Diosi et al. | |
| 2009/0305837 A1 | 12/2009 | Hiraiwa | |
| 2010/0019601 A1 | 1/2010 | Saban et al. | |
| 2010/0041507 A1 | 2/2010 | Gumpoltsberger et al. | |
| 2010/0041508 A1 | 2/2010 | Gumpoltsberger et al. | |
| 2010/0041509 A1 | 2/2010 | Gumpoltsberger et al. | |
| 2010/0044141 A1 | 2/2010 | Kimes et al. | |
| 2010/0139559 A1 | 6/2010 | Scott, Sr. et al. | |
| 2010/0311537 A1 | 12/2010 | Ziemer | |

(Continued)

FOREIGN PATENT DOCUMENTS

| | | | |
|---|---|---|---|
| DE | 102008000428 | 9/2009 | |
| DE | 102008041201 | 2/2010 | |
| DE | 102009027775 | 1/2011 | |
| EP | 0849498 | 6/1998 | |
| WO | WO2005/120877 | * 12/2005 | 475/275 |
| WO | WO2010139553 | 12/2010 | |
| WO | WO2010139559 | 12/2010 | |

*Primary Examiner* — David D Le
*Assistant Examiner* — Colby M Hansen (57) ABSTRACT

A transmission has an input member, an output member, two stacked planetary gear sets, a third planetary gear set, a plurality of coupling members and a plurality of torque transmitting devices. The stacked planetary gear sets have a first, second, third, fourth and fifth member and the third planetary gear set has a first, second and third member. The torque transmitting devices include clutches and brakes.

20 Claims, 4 Drawing Sheets

U.S. PATENT DOCUMENTS

| | | |
|---|---|---|
| 2011/0009228 A1 | 1/2011 | Bauknecht et al. |
| 2011/0009229 A1 | 1/2011 | Bauknecht et al. |
| 2011/0256977 A1* | 10/2011 | Hart et al. .................... 475/275 |
| 2012/0010038 A1* | 1/2012 | Hart et al. .................... 475/296 |
| 2012/0065019 A1* | 3/2012 | Hart et al. .................... 475/271 |
| 2012/0065020 A1* | 3/2012 | Mellet et al. .................. 475/275 |
| 2012/0172170 A1* | 7/2012 | Wittkopp et al. ............. 475/271 |
| 2012/0178579 A1* | 7/2012 | Hart et al. .................... 475/271 |

* cited by examiner

| GEAR STATE | GEAR RATIO | RATIO STEP | CLUTCHING ELEMENTS ||||
|---|---|---|---|---|---|---|
| | | | 30 | 32 | 28 | 26 |
| Rev | -4.851 | | X | | | X |
| N | | -0.90 | | | | |
| 1st | 5.398 | | X | | X | |
| 2nd | 3.647 | 1.48 | X | X | | |
| 3rd | 2.313 | 1.58 | | X | X | |
| 4th | 1.562 | 1.48 | | X | | X |
| 5th | 1.000 | 1.56 | | | X | X |

X = On, carrying torque
O = On, NOT carrying torque

| GEAR STATE | GEAR RATIO | RATIO STEP | CLUTCHING ELEMENTS | | | | |
|---|---|---|---|---|---|---|---|
| | | | 30 | 32 | 28 | 26 | 34 |
| Rev | -4.649 | | X | | | X | |
| N | | -0.84 | | | | | |
| 1st | 5.526 | | X | | X | | |
| 2nd | 3.725 | 1.48 | X | X | | | |
| 3rd | 2.462 | 1.51 | | X | X | | |
| 4th | 1.646 | 1.50 | | X | | X | |
| 5th | 1.300 | 1.27 | | X | | | X |
| 6th | 1.000 | 1.30 | | | X | | X |

X = On, carrying torque
O = On, NOT carrying torque

*Fig-5*

MULTI-SPEED TRANSMISSION HAVING STACKED PLANETARY GEAR SETS

FIELD

The invention relates generally to a multiple speed transmission having a plurality of planetary gear sets and a plurality of torque transmitting devices and more particularly to a transmission having five or more speeds, three planetary gear sets of which two are stacked and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, three planetary gear sets of which two are stacked to form a stacked planetary gear set arrangement, a plurality of coupling members and a plurality of torque transmitting devices. The torque transmitting devices are for example clutches and brakes.

In an aspect of the present invention, a planetary gear set is provided having a sun gear, a carrier member for rotatably supporting a plurality of pinion gears and a ring gear member. The stacked planetary gear set arrangement has a sun gear, a first carrier member for rotatably supporting a first plurality of pinion gears, a second carrier member for rotatably supporting a second plurality of pinion gears, a ring gear and a common member.

In another embodiment of the present invention, an interconnecting member continuously interconnects the ring gear of the stacked planetary gear set arrangement with the sun gear of the planetary gear set.

In still another embodiment of the present invention, a first torque transmitting mechanism is provided that is selectively engageable to interconnect the common member of the stacked planetary gear set arrangement with the sun gear of the planetary gear set and the input member.

In still another embodiment of the present invention, a second torque transmitting mechanism is provided that is selectively engageable to interconnect the common member of the stacked planetary gear set arrangement with the carrier member of the planetary gear set and the output member.

In still another embodiment of the present invention, a third torque transmitting mechanism is provided that is selectively engageable to interconnect the first carrier member and the second carrier member of the stacked planetary gear set arrangement with a stationary member.

In still another embodiment of the present invention, a fourth torque transmitting mechanism is provided that is selectively engageable to interconnect the first member of the stacked planetary gear set arrangement with the stationary member.

In another embodiment of the present invention, a fifth torque transmitting mechanism is provided that is selectively engageable to interconnect the first carrier member of the stacked planetary gear set arrangement with the sun gear of the planetary gear set and the input member to produce a sixth gear ratio.

In still another embodiment of the present invention, the torque transmitting mechanisms are selectively engageable in combinations of at least two to establish at least five forward speed ratios and at least one reverse speed ratio between the input member and the output member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
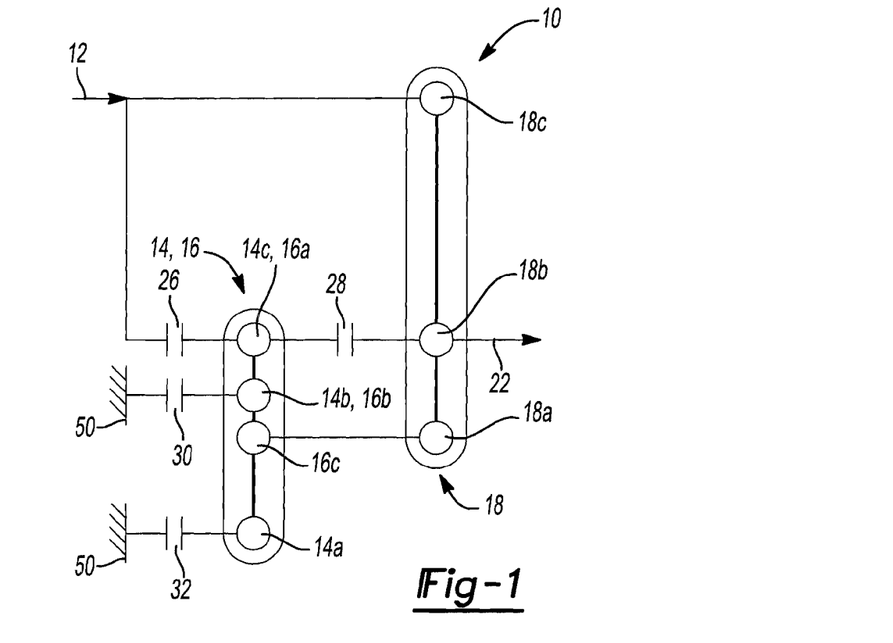
FIG. 1 is a lever diagram of an embodiment of a five speed transmission according to the present invention.

Referring now to FIG. 1, an embodiment of a five or more speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18 and an output shaft or member 22. In the lever diagram of FIG. 1, the first planetary gear set 14 and the second planetary gear set 16 have been combined and are represented by a single four node lever having: a first node 14A, a second node 16C, a third node 14B, 16B and a fourth node 14C, 16A. The lever of the third planetary gear set 18 has three nodes: a first node 18A, a second node 18B and a third node 18C.

The input member 12 is continuously coupled to the third node 18C of the third planetary gear set 18. The output member 22 is continuously coupled to the second node 18B of the third planetary gear set 18. The second node 16C of the second planetary gear set 16 is coupled to the first node 18A of the third planetary gear set 18.

A first clutch 26 selectively connects the third node 18C of the third planetary gear set 18 and the input member or shaft 12 with the fourth node 14C, 16A. A second clutch 28 selectively connects fourth node 14C, 16A with the second node 18B of the third planetary gear set 18 and output member 22. A first brake 30 selectively connects the third node 14B, 16B with a stationary member or transmission housing 50. A second brake 32 selectively connects the first node 14A of the first planetary gear set 14 with a stationary member or transmission housing 50.

Figure 2:
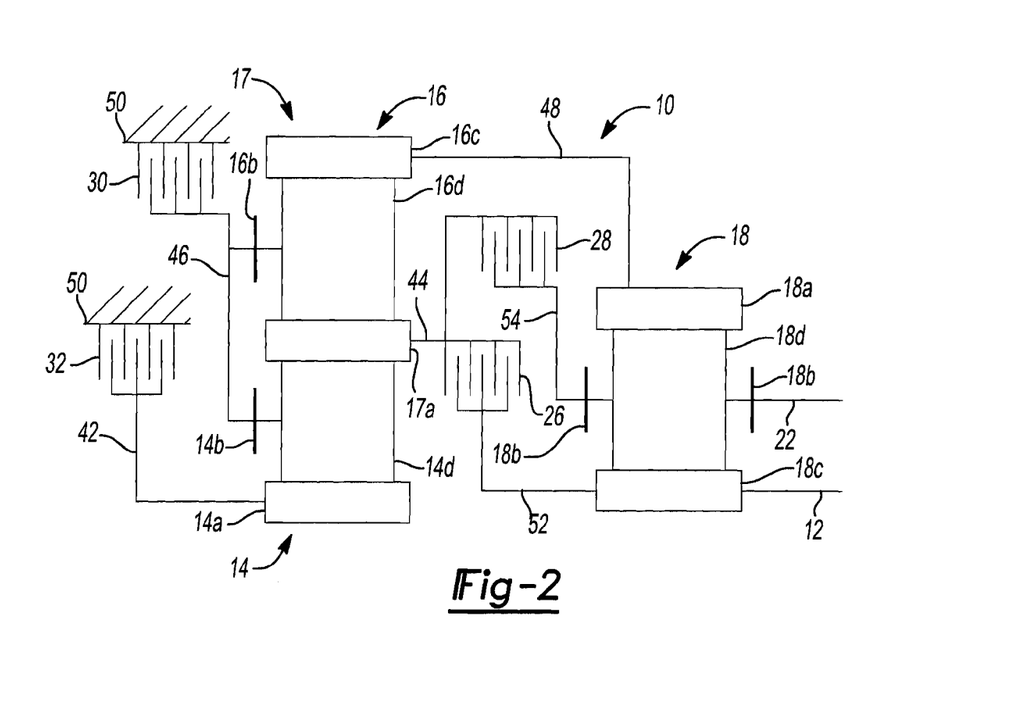
FIG. 2 is a diagrammatic illustration of an embodiment of a five speed transmission according to the present invention.

Referring now to FIG. 2, a stick diagram presents a schematic layout of the embodiment of the five speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

Planetary gear sets 14 and 16 are stacked planetary gear sets that form a stacked planetary gear set arrangement 17. Stacked planetary gear set arrangement 17 includes a common member 17A that corresponds with the fourth node 14C, 16A of the lever diagram shown in FIG. 1. Common member 17A functions as the ring gear member of planetary gear set 14 and simultaneously as the sun gear member of planetary gear set 16. Planetary gear set 14 further includes a sun gear member 14A and a planet gear carrier member 14B that rotatably supports a set of planet gears 14D (only one of which is shown). The sun gear member 14A is connected for common rotation with a first shaft or interconnecting member 42. The ring gear member or common member 17A is connected for common rotation with a second shaft or interconnecting member 44. The planet carrier member 14B is connected for common rotation with a third shaft or interconnecting member 46. The planet gears 14D are each configured to intermesh with both sun gear member 14A and ring gear or common member 17A.

In planetary gear set 16, common member 17A functions as the sun gear member of planetary gear sets 16. Planetary gear set 16 further includes a ring gear member 16C and a planet gear carrier member 16B that rotatably supports a set of planet gears 16D (only one of which is shown). As stated above with respect to planetary gear set 14, common member 17A is connected for common rotation with a second shaft or interconnecting member 44. The ring gear member 16C is connected for common rotation with a fourth shaft or interconnecting member 48. The planet carrier member 16B is connected for common rotation with a third shaft or interconnecting member 46. The planet gears 16D are each configured to intermesh with both sun gear member or common member 17A and ring gear member 16C. Of course, the present invention contemplates that the carrier members 14B and 16B of planetary gear sets 14 and 16 may be combined to form a single carrier member.

The planetary gear set 18 includes a sun gear member 18C, a ring gear member 18A and a planet gear carrier member 18B that rotatably supports a set of planet gears 18D (only one of which is shown). The sun gear member 18C is connected for common rotation with a fifth shaft or interconnecting member 52 and with the input member or shaft 12. The ring gear member 18A is connected for common rotation with the fourth shaft or interconnecting member 48. The planet carrier member 18B is connected for common rotation with a sixth shaft or interconnecting member 54 and with output member or shaft 22. The planet gears 18D are each configured to intermesh with both the sun gear member 18C and the ring gear member 18A.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or clutches 26, 28 and brakes 30, 32 allow for selective interconnection of the shafts or interconnecting members, members of the planetary gear sets and the housing. For example, the first clutch 26 is selectively engageable to connect the second shaft or interconnecting member 44 with the fifth shaft or interconnecting member 52. The second clutch 28 is selectively engageable to connect the second shaft or interconnecting member 44 with the sixth shaft or interconnecting member 54. The first brake 30 is selectively engageable to connect the third shaft or interconnecting member 46 with the stationary element or the transmission housing 50 in order to restrict the member 46 from rotating relative to the transmission housing 50. The second brake 32 is selectively engageable to connect the first shaft or interconnecting member 42 with the stationary element or the transmission housing 50 in order to restrict the member 42 from rotating relative to the transmission housing 50.

Figure 3:
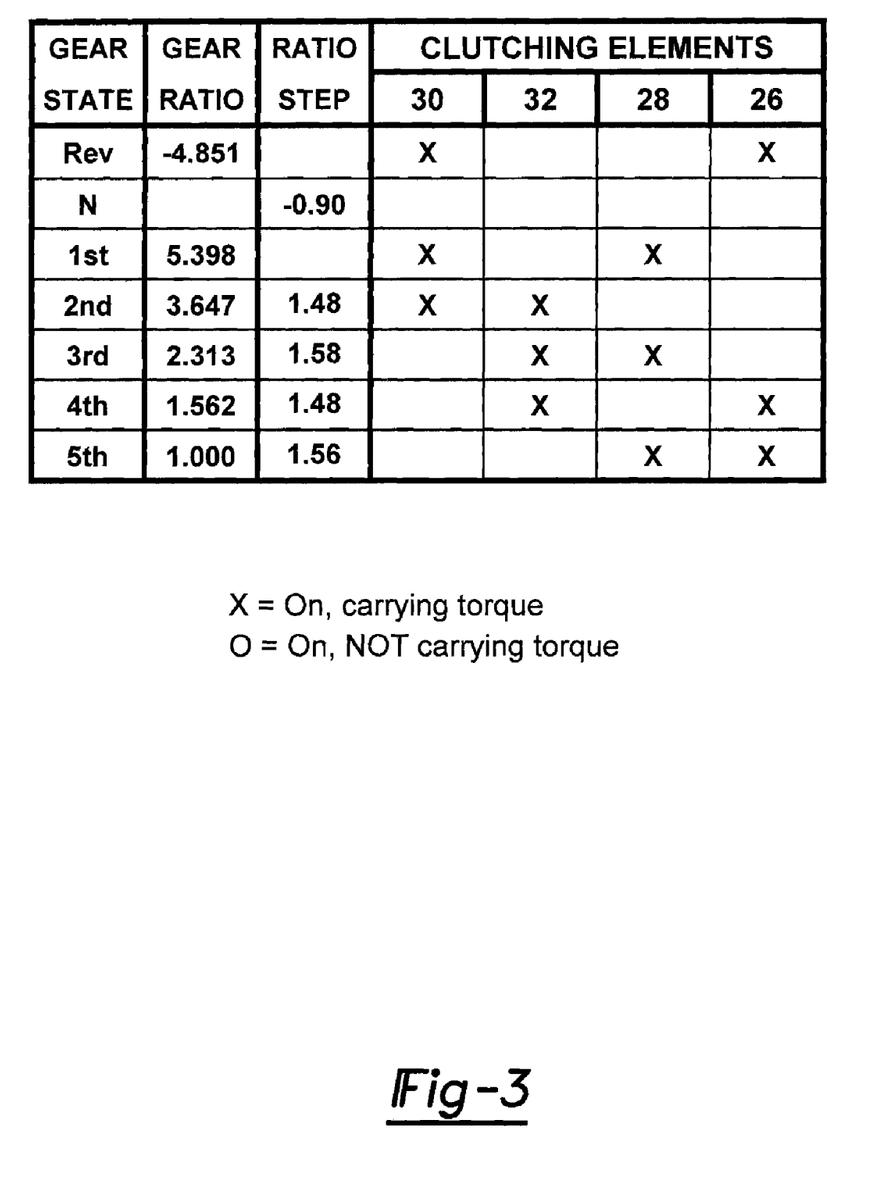
FIG. 3 is a truth table presenting the state of engagement of the various torque transmitting elements in each of the available forward and reverse speeds or gear ratios of the transmission illustrated in FIGS. 1 and 2.

Referring now to FIG. 2 and FIG. 3, the operation of the embodiment of the five speed transmission 10 will be described. It will be appreciated that transmission 10 is capable of transmitting torque from the input shaft or member 12 to the output shaft or member 22 in at least five forward speed or torque ratios and at least one reverse speed or torque ratio. Each forward and reverse speed or torque ratio is attained by engagement of one or more of the torque-transmitting mechanisms (i.e. first clutch 26, second clutch 28, first brake 30 and second brake 32), as will be explained below. FIG. 3 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. A "G" represents that a garage shift element has to switch on and carrying torque when the transmission mode selector or shifter (Park, Reverse, Neutral, Drive or Low gear selector) is moved from reverse to drive and switch off when shifting back to reverse. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

For example, to establish a reverse gear, first clutch 26 and first brake 30 are engaged or activated. The first clutch 26 connects the second shaft or interconnecting member 44 with the fifth shaft or interconnecting member 52. The first brake 30 connects the third shaft or interconnecting member 46 with the stationary element or the transmission housing 50 in order to restrict the member 46 from rotating relative to the transmission housing 50. Likewise, the five forward ratios are achieved through different combinations of clutch and brake engagement, as shown in FIG. 3.

It will be appreciated that the foregoing explanation of operation and gear states of the five speed transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Figure 4:
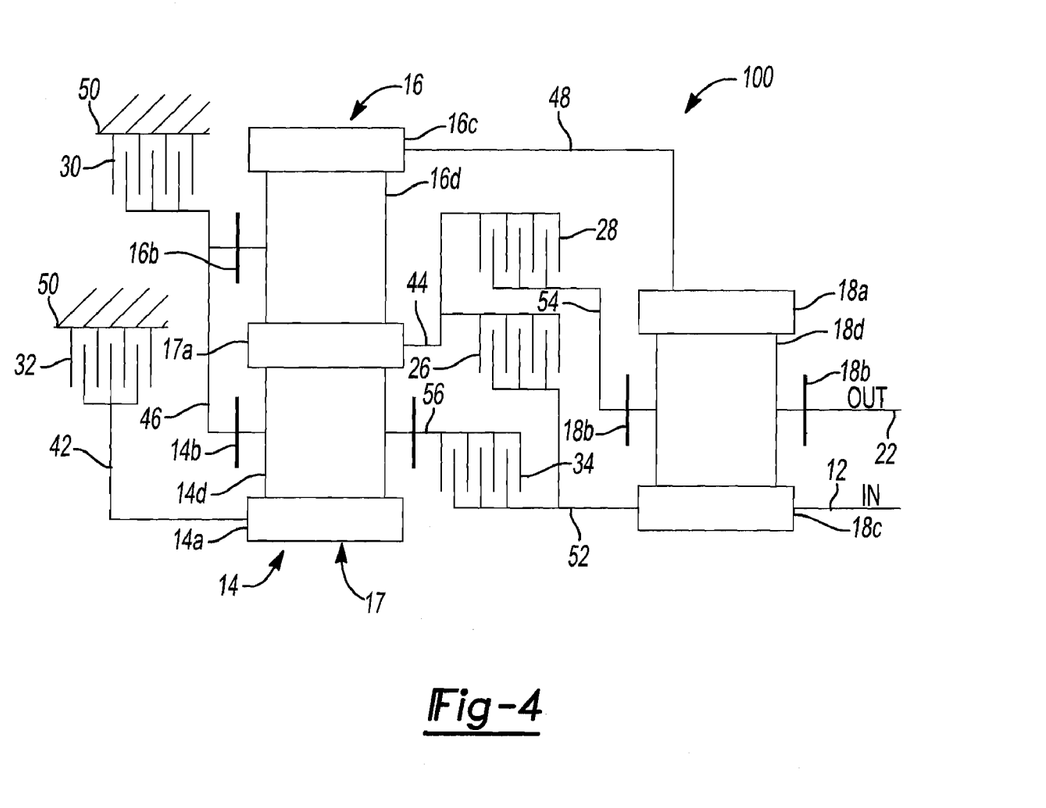
FIG. 4 is a diagrammatic illustration of an embodiment of a six speed transmission according to the present invention.

In another embodiment of the present invention, a six speed transmission 100 is provided with the addition of a fifth torque transmitting element or third clutch 34. As shown in FIG. 4, the configuration and arrangement of the stacked planetary gear set 17 and planetary gear set 18 remain the same, as well as, the interconnecting members or shafts 42, 44, 46, 48 and 52 and torque transmitting or clutching elements 26, 28, 30 and 32 as in the five speed transmission 10 described above. The third clutch 34 is connected to the second member or carrier member 14B of the first planetary gear set 14 through a seventh interconnecting member or shaft 56. The fifth interconnecting member or shaft 52 is modified or reconfigured in the present embodiment to connect third clutch 34 to the sun gear 18C of the second planetary gear set 18 and the input member 12. Accordingly, third clutch 34 is activated to connect fifth interconnecting member or shaft 52 with the seventh interconnecting member or shaft 56.

Figure 5:
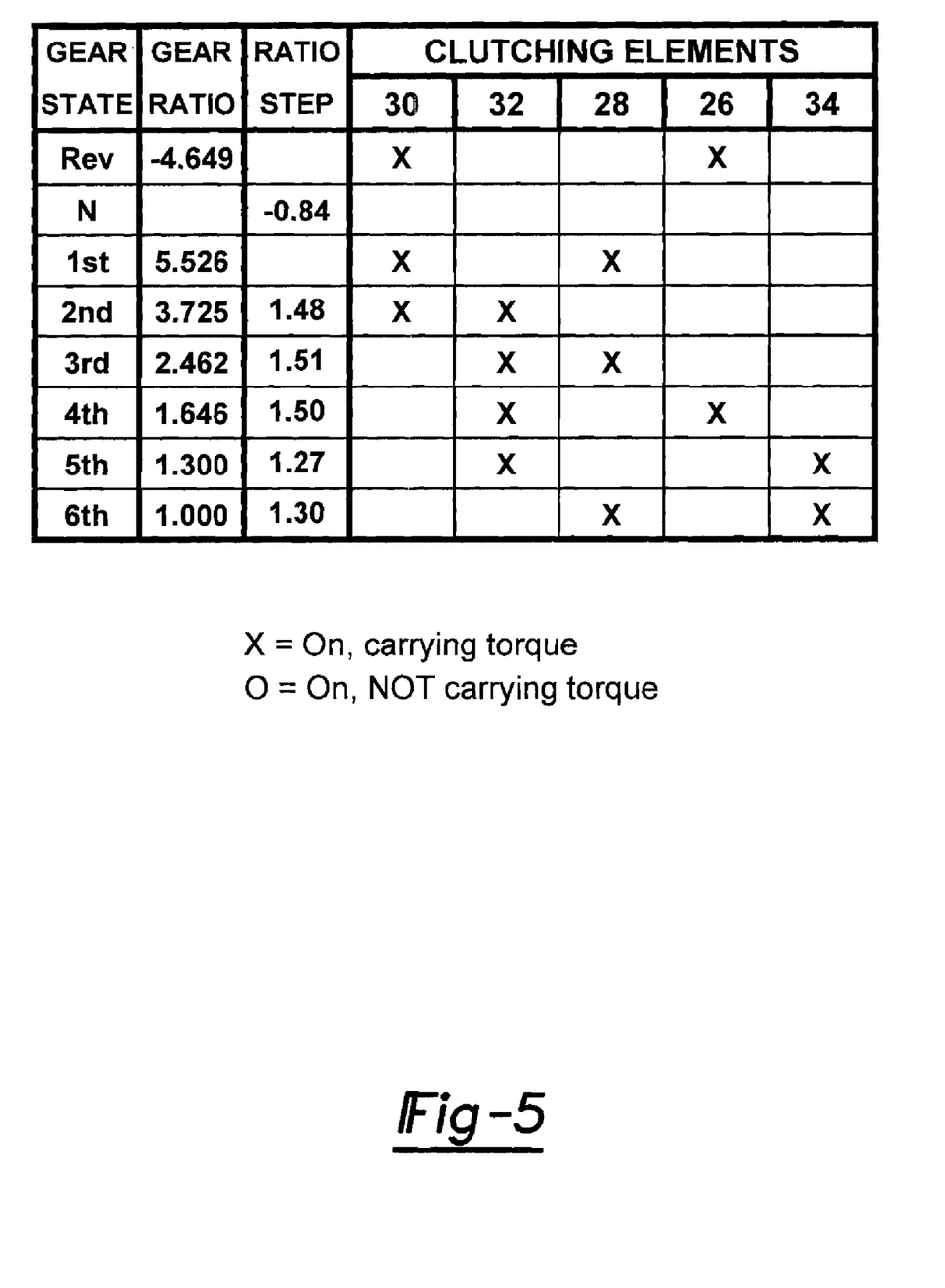
FIG. 5 is a truth table presenting the state of engagement of the various torque transmitting elements in each of the available forward and reverse speeds or gear ratios of the transmission illustrated in FIG. 4.

A truth table presenting the state of engagement of the various torque transmitting elements in each of the available forward and reverse speeds or gear ratios of transmission 100 illustrated in FIG. 4 is shown in FIG. 5. For example, to establish a sixth gear ratio second clutch 28 and third clutch 34 are engaged or activated. Second clutch 28 is selectively engageable to connect the second shaft or interconnecting member 44 with the sixth shaft or interconnecting member 54. Third clutch 34 is selectively engageable to connect fifth interconnecting member or shaft 52 with the seventh interconnecting member or shaft 56.

The description of the invention is merely exemplary in nature and variations that do not depart from the essence of the invention are intended to be within the scope of the invention. Such variations are not to be regarded as a departure from the spirit and scope of the invention.

The invention claimed is:

1. A transmission comprising:
    a planetary gear set having a first, a second and a third member;
    a stacked planetary gear set arrangement having a first member, a second member, a third member, a fourth member and a fifth member;
    an input member connected for common rotation with at least one of the first, second, and third members of the planetary gear set;
    an output member connected for common rotation with at least one of the first, second, and third members of the planetary gear set;
    an interconnecting member continuously interconnecting the third member of the stacked planetary gear set arrangement with the first member of the planetary gear set; and
    at least four torque transmitting mechanisms each selectively engageable to interconnect one of the first, second, third, fourth, and fifth members of the stacked planetary gear set arrangement and the first, second and third members of the planetary gear set with another one of the first, second, third, fourth, and fifth members of the stacked planetary gear set arrangement the first, second and third members of the planetary gear set and a stationary member, and
    wherein the at least four torque transmitting mechanisms are selectively engageable in combinations of at least two to establish at least five forward speed ratios and at least one reverse speed ratio between the input member and the output member.

2. The transmission of claim 1 wherein a first of the at least four torque transmitting mechanisms is selectively engageable to interconnect the fifth member of the stacked planetary gear set arrangement with the third member of the planetary gear set and the input member.

3. The transmission of claim 2 wherein a second of the at least four torque transmitting mechanisms is selectively engageable to interconnect the fifth member of the stacked planetary gear set arrangement with the second member of the planetary gear set and the output member.

4. The transmission of claim 3 wherein a third of the at least four torque transmitting mechanisms is selectively engageable to interconnect the second and the fourth members of the stacked planetary gear set arrangement with the stationary member.

5. The transmission of claim 4 wherein a fourth of the at least four torque transmitting mechanisms is selectively engageable to interconnect the first member of the stacked planetary gear set arrangement with the stationary member.

6. The transmission of claim 5 further comprising a fifth torque transmitting mechanism that is selectively engageable to interconnect the second member of the stacked planetary gear set arrangement with the third member of the planetary gear set and the input member.

7. The transmission of claim 1 wherein two of the at least four torque transmitting mechanisms are brakes for connecting at least one of the members of the stacked planetary gear set arrangement and planetary gear set to the stationary member and two of the at least four torque transmitting mechanisms are clutches for connecting at least one other of the members of the stacked planetary gear set arrangement and planetary gear set to at least one other member of the stacked planetary gear set arrangement and planetary gear set.

8. The transmission of claim 1 wherein the third member of the planetary gear set and the first member of the stacked planetary gear set arrangement are sun gears, the second and fourth members of the stacked planetary gear set arrangement and the second member of the planetary gear set are carrier members and the first member of the planetary gear set and third member of the stacked planetary gear set arrangement are ring gears.

9. The transmission of claim 8 wherein the fifth member of the stacked planetary gear set arrangement meshes with the a first plurality of pinion gears rotatably supported by the second member of the stacked planetary gear set arrangement and with a second plurality of pinion gears rotatably supported by the fourth member of the stacked planetary gear set arrangement.

10. The transmission of claim 1 wherein the input shaft is connected for common rotation with the third member of the planetary gear set and the output shaft is connected for common rotation with the second member of the planetary gear set.

11. A transmission comprising:
a planetary gear set having a first, a second and a third member;
a stacked planetary gear set arrangement having a first member, a second member, a third member, a fourth member and a fifth member;
an input member connected for common rotation with at least one of the first, second, and third members of the planetary gear set;
an output member connected for common rotation with at least one of the first, second, and third members of the planetary gear set;
an interconnecting member continuously interconnecting the third member of the stacked planetary gear set arrangement with the first member of the planetary gear set;
a first torque transmitting mechanism selectively engageable to interconnect the fifth member of the stacked planetary gear set arrangement with the third member of the planetary gear set and the input member;
a second torque transmitting mechanism selectively engageable to interconnect the fifth member of the stacked planetary gear set arrangement with the second member of the planetary gear set and the output member;
a third torque transmitting mechanism selectively engageable to interconnect the second and the fourth members of the stacked planetary gear set arrangement with a stationary member; and
a fourth torque transmitting mechanism selectively engageable to interconnect the first member of the stacked planetary gear set arrangement with the stationary member, and
wherein the torque transmitting mechanisms are selectively engageable in combinations of at least two to establish at least five forward speed ratios and at least one reverse speed ratio between the input member and the output member.

12. The transmission of claim 11 wherein the third member of the planetary gear set and the first member of the stacked planetary gear set arrangement are sun gears, the second and fourth members of the stacked planetary gear set arrangement and the second member of the planetary gear set are carrier members and the first member of the planetary gear set and third member of the stacked planetary gear set arrangement are ring gears.

13. The transmission of claim 12 wherein the fifth member of the stacked planetary gear set arrangement meshes with the a first plurality of pinion gears rotatably supported by the second member of the stacked planetary gear set arrangement and with a second plurality of pinion gears rotatably supported by the fourth member of the stacked planetary gear set arrangement.

14. The transmission of claim 11 further comprising a fifth torque transmitting mechanism that is selectively engageable to interconnect the second member of the stacked planetary gear set arrangement with the third member of the planetary gear set and the input member to produce a sixth gear ratio.

15. The transmission of claim 11 wherein the input shaft is connected for common rotation with the third member of the planetary gear set and the output shaft is connected for common rotation with the second member of the planetary gear set.

16. A transmission comprising:
an input shaft;
an output shaft;
a planetary gear set having a sun gear, a carrier member for rotatably supporting a plurality of pinion gears and a ring gear member wherein the input shaft is connected for common rotation with the sun gear of the planetary gear set and the output shaft is connected for common rotation with the carrier member of the planetary gear set;
a stacked planetary gear set arrangement having a sun gear, a first carrier member for rotatably supporting a first plurality of pinion gears, a second carrier member for rotatably supporting a second plurality of pinion gears, a ring gear and a common member;
an interconnecting member continuously interconnecting the ring gear of the stacked planetary gear set arrangement with the ring gear of the planetary gear set;
a first torque transmitting mechanism selectively engageable to interconnect the common member of the stacked planetary gear set arrangement with the sun gear of the planetary gear set and the input member;
a second torque transmitting mechanism selectively engageable to interconnect the common member of the stacked planetary gear set arrangement with the carrier member of the planetary gear set and the output member;
a third torque transmitting mechanism selectively engageable to interconnect the first carrier member and the second carrier member of the stacked planetary gear set arrangement with a stationary member; and
a fourth torque transmitting mechanism selectively engageable to interconnect the first member of the stacked planetary gear set arrangement with the stationary member, and
wherein the torque transmitting mechanisms are selectively engageable in combinations of at least two to establish at least five forward speed ratios and at least one reverse speed ratio between the input member and the output member.

17. The transmission of claim 16 wherein the common member of the stacked planetary gear set arrangement meshes with the first plurality of pinion gears rotatably supported by the first carrier member of the stacked planetary gear set arrangement and with the second plurality of pinion gears rotatably supported by the second carrier member of the stacked planetary gear set arrangement.

18. The transmission of claim 17 further comprising a fifth torque transmitting mechanism that is selectively engageable to interconnect the first carrier member of the stacked planetary gear set arrangement with the sun gear of the planetary gear set and the input member to produce a sixth gear ratio.

19. A transmission comprising:
an input shaft;
an output shaft;
a planetary gear set having a sun gear, a carrier member for rotatably supporting a plurality of pinion gears and a ring gear member wherein the input shaft is connected for common rotation with the sun gear of the planetary gear set and the output shaft is connected for common rotation with the carrier member of the planetary gear set;

a stacked planetary gear set arrangement having a sun gear, a first carrier member for rotatably supporting a first plurality of pinion gears, a second carrier member for rotatably supporting a second plurality of pinion gears, a ring gear and a common member;

an interconnecting member continuously interconnecting the ring gear of the stacked planetary gear set arrangement with the ring gear of the planetary gear set;

a first torque transmitting mechanism selectively engageable to interconnect the common member of the stacked planetary gear set arrangement with the sun gear of the planetary gear set and the input member;

a second torque transmitting mechanism selectively engageable to interconnect the common member of the stacked planetary gear set arrangement with the carrier member of the planetary gear set and the output member;

a third torque transmitting mechanism selectively engageable to interconnect the first carrier member and the second carrier member of the stacked planetary gear set arrangement with a stationary member;

a fourth torque transmitting mechanism selectively engageable to interconnect the first member of the stacked planetary gear set arrangement with the stationary member; and a fifth torque transmitting mechanism that is selectively engageable to interconnect the first carrier member of the stacked planetary gear set arrangement with the sun gear of the planetary gear set and the input member, and wherein the torque transmitting mechanisms are selectively engageable in combinations of at least two to establish at least five forward speed ratios and at least one reverse speed ratio between the input member and the output member.

20. The transmission of claim 19 wherein the common member of the stacked planetary gear set arrangement meshes with the first plurality of pinion gears rotatably supported by the first carrier member of the stacked planetary gear set arrangement and with the second plurality of pinion gears rotatably supported by the second carrier member of the stacked planetary gear set arrangement.

* * * * *